US010616153B2

(12) United States Patent
Thapliyal et al.

(10) Patent No.: US 10,616,153 B2
(45) Date of Patent: Apr. 7, 2020

(54) REAL-TIME COMMUNICATIONS SYSTEM WITH INTELLIGENT PRESENCE INDICATION

(71) Applicant: GetGo, Inc., Fort Lauderdale, FL (US)

(72) Inventors: Ashish V. Thapliyal, Santa Barbara, CA (US); Nikolay Avrionov, Santa Barbara, CA (US)

(73) Assignee: LogMeIn, Inc., Boston, MA (US)

( * ) Notice: Subject to any disclaimer, the term of this patent is extended or adjusted under 35 U.S.C. 154(b) by 339 days.

(21) Appl. No.: 15/395,882

(22) Filed: Dec. 30, 2016

(65) Prior Publication Data
US 2018/0191647 A1 Jul. 5, 2018

(51) Int. Cl.
H04L 12/58 (2006.01)
H04L 29/08 (2006.01)

(52) U.S. Cl.
CPC ............ H04L 51/043 (2013.01); H04L 67/24 (2013.01)

(58) Field of Classification Search
CPC .......................... H04L 51/043; H04L 67/104
USPC ........................................................ 709/206
See application file for complete search history.

(56) References Cited

U.S. PATENT DOCUMENTS

| 5,732,218 | A | * | 3/1998 | Bland | G06F 11/3495 709/224 |
| 7,730,135 | B2 | | 6/2010 | Petrovykh | |
| 8,375,092 | B2 | * | 2/2013 | Digate | G06Q 10/10 709/204 |
| 8,422,487 | B2 | * | 4/2013 | Mason | H04L 51/043 370/252 |
| 8,510,238 | B1 | * | 8/2013 | Aradhye | G06N 99/005 706/12 |
| 8,615,750 | B1 | * | 12/2013 | Narayana Iyer | G06F 11/3624 709/203 |
| 9,591,392 | B2 | * | 3/2017 | Siegel | H04R 1/10 |
| 2003/0002246 | A1 | * | 1/2003 | Kerr | G06F 1/1601 361/679.02 |
| 2003/0018694 | A1 | * | 1/2003 | Chen | G06F 8/60 709/200 |
| 2003/0074207 | A1 | * | 4/2003 | Pace | G06F 8/60 709/204 |
| 2003/0212828 | A1 | * | 11/2003 | Miyazaki | G06Q 30/06 709/248 |
| 2004/0059781 | A1 | * | 3/2004 | Yoakum | H04L 29/06 709/204 |

(Continued)

Primary Examiner — David R Lazaro
Assistant Examiner — Berhanu Shitayewoldetadik
(74) Attorney, Agent, or Firm — BainwoodHuang

(57) ABSTRACT

In a distributed computing system, clients of a communications application are deployed on user devices. The clients on target user devices collect and report context information for a target user such as location and application-in-use. Reported context information is associated with response time information describing time to respond to initiation of communications in respective contexts, and a predictive model is maintained and used to obtain an estimate for a response time of the target user to respond to a new initiation of communications in a current context. A presence indicator on an initiator user device provides a presence indicator for the target user, and is generated and updated by obtaining current context of the target user and applying it to the predictive model to obtain an estimate of a current response time of the target user, and setting a value of the presence indicator according to the estimate.

20 Claims, 4 Drawing Sheets

(56) References Cited

U.S. PATENT DOCUMENTS

| | | | |
|---|---|---|---|
| 2004/0201668 A1* | 10/2004 | Matsubara | H04L 67/104 348/14.05 |
| 2005/0240558 A1* | 10/2005 | Gil | G06F 17/30893 |
| 2006/0224759 A1* | 10/2006 | Fang | H04L 65/4084 709/231 |
| 2007/0276909 A1* | 11/2007 | Chavda | H04L 51/043 709/204 |
| 2008/0126013 A1* | 5/2008 | Kangas | A63B 24/0062 702/188 |
| 2008/0225870 A1* | 9/2008 | Sundstrom | G06Q 10/10 370/401 |
| 2009/0125585 A1* | 5/2009 | Krishnaswamy | G06Q 30/02 709/203 |
| 2010/0250730 A1* | 9/2010 | Menzies | G06F 21/105 709/224 |
| 2011/0196925 A1* | 8/2011 | Hans | G06Q 30/02 709/204 |
| 2012/0207292 A1* | 8/2012 | Rosenberg | H04L 51/046 379/93.02 |
| 2013/0198281 A1* | 8/2013 | Scuba | H04L 67/18 709/204 |
| 2013/0346347 A1* | 12/2013 | Patterson | G06N 99/005 706/12 |
| 2014/0046879 A1* | 2/2014 | MacLennan | G06N 99/005 706/12 |
| 2014/0667982 * | 3/2014 | Albouyeh | G06F 15/16 709/207 |
| 2014/0245004 A1* | 8/2014 | Houston | H04L 63/20 713/168 |
| 2014/0287728 A1* | 9/2014 | Lim | H04L 51/28 455/414.1 |
| 2015/0017967 A1* | 1/2015 | Cao | H04W 4/18 455/418 |
| 2015/0033305 A1* | 1/2015 | Shear | G06F 21/45 726/11 |
| 2015/0371637 A1* | 12/2015 | Neubacher | G10L 15/26 704/235 |
| 2016/0142256 A1* | 5/2016 | Yang | H04L 41/0823 709/223 |
| 2016/0314318 A1* | 10/2016 | Li | G06F 21/6263 |
| 2016/0337328 A1* | 11/2016 | Sallam | H04L 63/0861 |
| 2016/0357362 A1* | 12/2016 | Gauci | G06F 9/451 |
| 2017/0238275 A1* | 8/2017 | De Pasquale | H04W 52/0238 370/252 |
| 2018/0075360 A1* | 3/2018 | Tanimoto | G06N 5/048 |

* cited by examiner

REAL-TIME COMMUNICATIONS SYSTEM WITH INTELLIGENT PRESENCE INDICATION

BACKGROUND

The present invention is related to the field of real-time data communications systems and applications such as instant messaging and chat applications. In particular, it relates to such systems that collect and use presence information describing a user's availability for engaging in communications.

SUMMARY

In presence there are two parties: a first party whose presence is being shown, referred to as a "target" herein, and a second party who is seeing the presence of the target and who may be interested in initiating communication with the target, and is thus referred to as the "initiator".

A disclosed system collects context information about targets such as their location and speed (e.g., using mobile phone GPS), which application they are working on, their calendar, periodic patterns for their history, which device are they using, etc. Given all this data, a machine learning/statistical model is built to predict how long the target will take to respond to initiation of communications by an initiator. A predicted time-to-respond value is displayed to the initiator in some manner, e.g., as a number or as a visual indicator such as color, etc. The initiator can use this information to make a decision whether/how to communicate with a target, and/or to know when to expect a response to initiated communications.

More particularly, a method is disclosed of operating a distributed computing system to provide presence information about a target user to an initiator user. The method includes:

deploying respective clients of a communications application on devices of the target user and on a device of the initiator user;

by the clients on the devices of the target user over a predetermined minimum operating period, regularly collecting and reporting context information for the target user, the context information describing at least location and application-in-use of the target user;

by a computing device of the system (e.g., a server, or a client in a peer-to-peer arrangement), associating the reported context information with corresponding response time information describing elapsed time between initiation of communications with the target user and corresponding responses by the target user in respective contexts, and maintaining a predictive model using the stored context information and associated response time information, the predictive model taking as input a description of a context of the target user and returning a corresponding estimate for a response time of the target user to respond to a new initiation of communications; and operating a user interface of the client on the device of the initiator user to provide a presence indicator for the target user to the initiator user, the presence indicator being generated and updated by (1) obtaining current context of the target user, (2) applying the current context to the predictive model to obtain an estimate of a current response time of the target user, and (3) setting a value of the presence indicator according to the estimate of the current response time.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
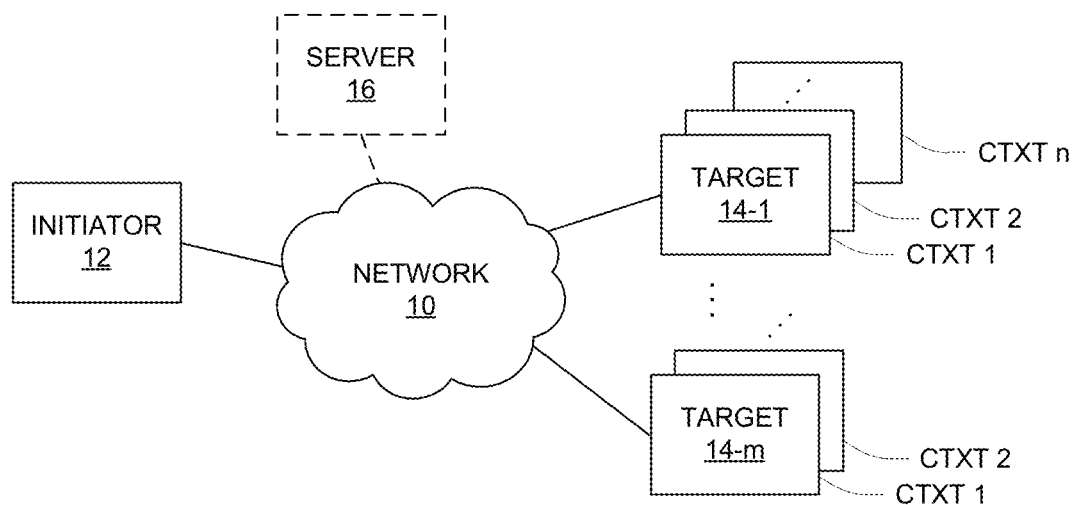
FIG. 1 is a block diagram of a distributed communications system.

FIG. 1 shows a distributed computing system including computerized devices interconnected by a network 10. The devices include client devices shown as an initiator 12 and targets 14 (shown as 14-*l*, . . . , 14-*m*). In some embodiments as described below, one or more servers 16 may also be included. The system provides a real-time communications service among the clients 12,14, such as video conferencing, "chat", etc. The present description refers to a chat application in particular, but this is only an example. It should be understood that "initiator" and "target" are particular roles or labels for certain functionality described herein. In fact, in a typical embodiment all clients are potentially initiators 12 (of communications with other clients) as well as targets 14 (of communications initiated by other clients). Also, the labels "initiator" and "target" may be used herein to refer both to the users of the communications service as well as their respective devices—the meaning should be clear in context.

Each target 14 is shown as having potentially multiple contexts, shown as CTXT 1, CTXT 2, . . . . "Context" generally refers to a distinct set of operating characteristics. Context characteristics can include physical location and whether a target 14 is mobile or stationary; an identification of an application being used by the target 14; appointment information from a target's calendar; and an identification of a device type being used (desktop, laptop, smartphone, etc.). There may be a variety of additional characteristics that may be utilized in a given embodiment. Generally, any characteristic that provides information for estimating a response time may be useful. As described herein, context information is used to generate an estimate of a response time of a target 14 to initiation of communications by the initiator 12, and to provide a response time indicator to the initiator 12 to help the initiator work more effectively (i.e., to have more accurate expected response time information, so that they can execute communications in the most effective/efficient manner).

Figure 2:
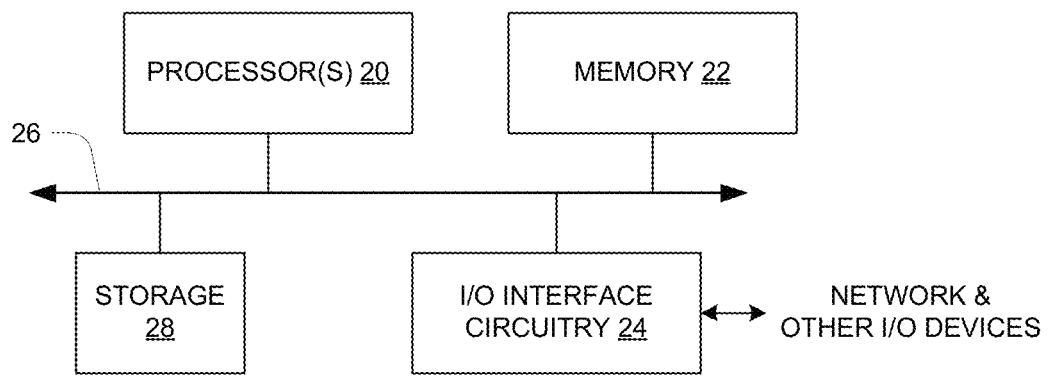
FIG. 2 is a block diagram of a computerized device from a hardware perspective.

FIG. 2 shows an example configuration of a physical computer (such as a client 12, 14 or server 16) or controller from a computer hardware perspective. The hardware includes one or more processors 20, memory 22, and I/O interface circuitry 24 interconnected by data interconnections 26 such as one or more high-speed data buses. The I/O interface circuitry 24 provides a hardware connection to the network 10 (FIG. 1) and perhaps other external devices/connections (EXT DEVs). The processor(s) 20 with connected memory 22 may also be referred to as "processing circuitry" herein. There may also be local secondary storage 28 such as a local-attached disk drive or Flash drive. In operation, the memory 22 stores data and instructions of system software (e.g., operating system) and one or more application programs which are executed by the processor(s) 20 to cause the hardware to function in a software-defined manner. Thus the computer hardware executing instructions of a communications application, such as described herein, can be referred to as a communications circuit or communications component, and it will be understood that a collection of such circuits or components can all be realized and interact with each other as one or more sets of computer processing hardware executing different computer programs as generally known in the art.

Figure 3:
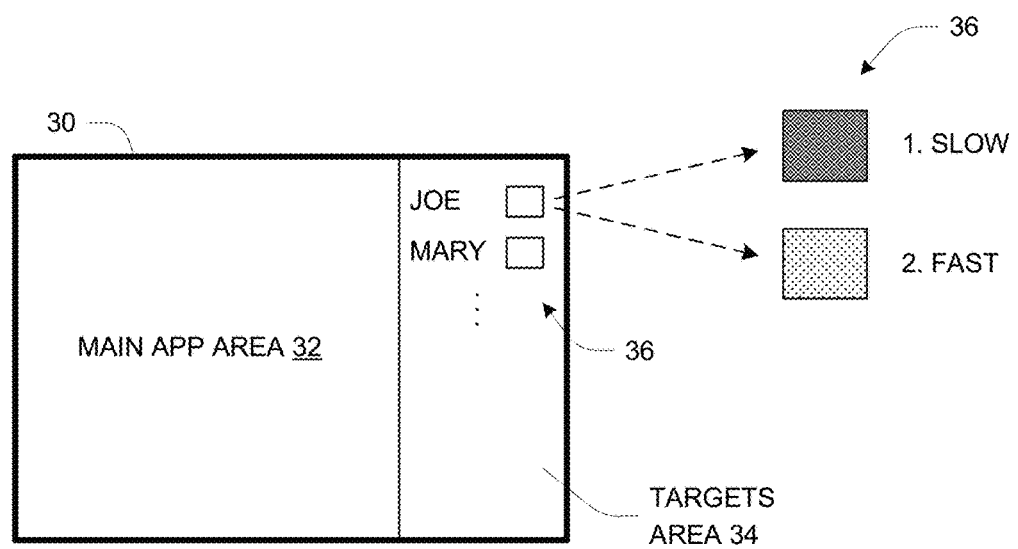
FIG. 3 is a schematic illustration of a user interface display.

FIG. 3 shows an example graphical user display screen 30 of the real-time communications service as displayed on a display device of the initiator 12. As shown, it has a main application (MAIN APP) area 32 and a targets area 34 where information about target users is displayed. In this simplified example, for each user there is a user name (e.g., Joe or Mary as shown) and a respective presence indicator 36. The presence indicator 36 in this example is a small square area in which a color and/or shading is displayed according to an estimate of the user's response time to initiated communications. As shown at right, in one scheme, the response time is indicated as a shade from dark to light, wherein dark indicates relatively slow response time and light indicates relatively faster response time. It will be appreciated that a variety of alternative types of presence indicators may be used. Grading of color or darkness is only one way of representing a range of values.

In operation, an initiator user of the GUI display screen 30 is presented with presence information about other (target) users via the presence indicators 36, and uses this information for a desired purpose, e.g., to decide whether to initiate communications and/or to just have an expectation of when the target user may respond. The presence indicators 36 might be updated in a variety of ways. For example, there may be a background process continually estimating user response times and updating the presence indicators 36. Alternatively, a presence indicator 36 may be updated in response to some action of the initiator user at this display 30, such as highlighting or otherwise selecting (e.g., with a pointer device) a specific target user, at which time only that user's response time is updated. The description below provides more detail of operation of at least one embodiment.

Figure 4:
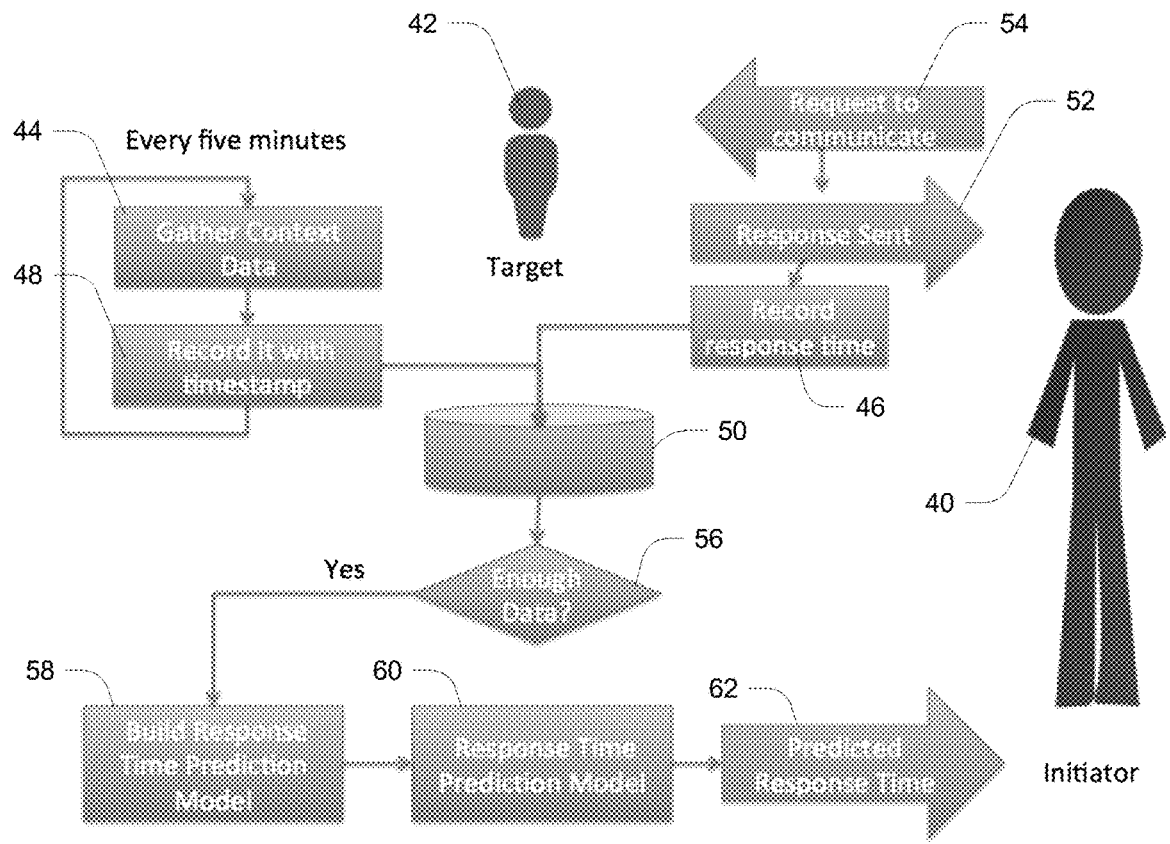
FIG. 4 is a schematic diagram depicting operation of the system.

FIG. 4 is a graphical depiction of operation, showing an initiator 40 and target 42. Some of the functions are described without reference to where they may be performed; additional specific details are provided further below.

Periodically (for example, every 5 minutes), the following is done:

a. At 44, collect context information about the target user, e.g.: Location. Speed. Application being used. Calendar. Device being used. This function may require the target user to provide permission on his/her device, using a "settings" interface of the device for example to make per-application permission settings.

b. At 46, note how long the target 42 takes to respond to a message in the current context (if a message is sent to the user at that time), and at 48 record that time (into storage 50) together with the context information from 44 and a timestamp (time of day/week/month/year). The response occurs at 52 in response to a request 54 from initiator 40 to communicate.

Once there is sufficient data (56), which typically requires at least some minimum operating period, then at 58 a predictive model 60 is built for response time given context, time of day, day of week, whether the day is a workday, etc., using standard machine learning techniques such as linear regression, decision trees, random forests, etc. A simple example of predictive algorithm for estimating the response time is as follows:

c. Let TI be the time of initiation of the communication by the initiator, and TR be the time at which the target responded. Let delta=TR−TI be the time delay in the response. In the case that there is no response to a communication, the time may be represented as a very large number to approximate infinity.

d. The algorithm collects this delta, and the context surrounding it. Thus a data series D is collected with D=[D_1, D_2, . . . , D_n] where D_i={timestamp_i, delta_i, context_i}, where context_i includes the context features (location, device, etc.) and the time-of-day. In the simple example of using just device_type, then context_i={device_type, time_of_day}. Note that this data is collected per target 42.

e. To estimate the expected response time 62 when an initiator 40 tries to contact the target 42, the following is done:

i. The data series D is queried to find events D_i that satisfy the constraints: time_of_day=within some time window (e.g., 30 minutes) of now, device_type=current_device_type, and delta is finite. Some number MinObs (e.g., 30) of the most recent observations are taken, ordered by timestamp, with the resulting dataset denoted D'. Then the estimated response time range is calculated as ResponseTimeEstimateRange=[Median(D')−AbsDeviation (D'), Median(D')+AbsDeviation(D')]. These are rounded to the nearest minute and the range is provided to the initiator 40 as value(s) of a presence indicator.

ii. If D' has less than MinObs observations, the following can be done:

1. Relaxing the device_type=current_device_type constraint on the event selection, a first ResponseTimeEstimateRange_time_of_day is calculated 2. By relaxing the time_of_day=within 30 min of now constraint on the event selection, a second ResponseTimeEstimateRange_time_of_day is calculated 3. The estimate range with the smallest spread can be selected and returned to the communication initiator iii. If both of the datasets in ii have less than MinObs observations, then both constraints can be removed and ResponseTimeEstimateRange calculated over the last MinObs observations. If there are still not MinObs observations, no estimate is calculated.

The predicted response time 62 is used to grade (apply a value to) the presence indicator provided to the initiator 40. For example, the actual expected time to respond may be displayed, or in the case of an indicator such as 36, a shade or color is used to signify how long the expected response time is.

Periodically (e.g., once a day) the response time prediction model 60 may be adjusted based on new context and response time data. Alternatively, the model may be updated continually during normal operation.

In one enhancement, per-target response times may be customized per initiator 40, which handles any variability due to the identity of the initiator 40. This is useful intuitively, because people have different response times to their boss, spouse, colleague, CEO of their company, etc. One way to do this is to build a predictive model per initiator 40, based on the previous history of communications between the initiator 40 and the target 42. If not enough per-initiator data is available, then a prediction can be made based on the more general (not initiator-customized) model.

Figure 5:
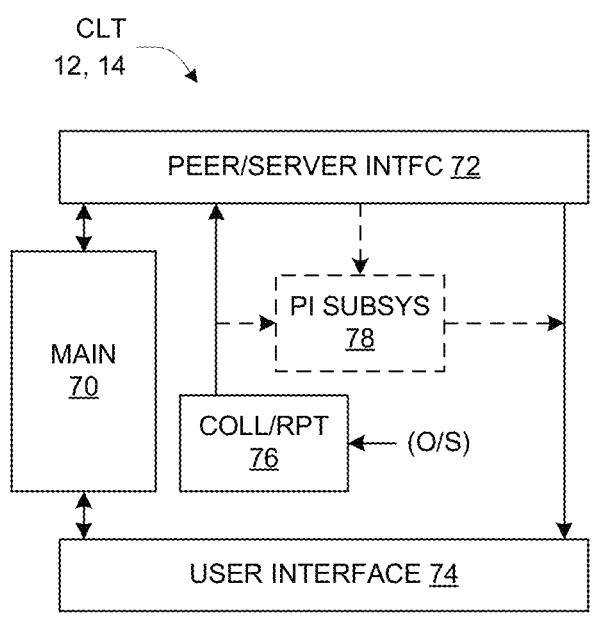
FIG. 5 is a functional block diagram of a client device.

FIG. 5 shows a client device 12, 14 from a functional perspective, i.e., as a collection of functions realized by a computerize device (FIG. 2) executing corresponding computer program instructions. This collection of functional blocks collectively implements the overall client functionality described herein. Functional blocks include a main application component (MAIN) 70, a peer/server interface (INTFC 72), a user interface 74, a collection/reporting (COLL/RPT) block 76, and optionally a presence indicator subsystem (PI SUBSYS) 78.

The main component 70 realizes the main functionality of the distributed communication application, e.g., a chat application. It contains various data structures and logic for interacting with a user, exchanging chat messages with remote users, monitoring and communicating status, etc.

The peer/server interface 72 handles lower level details of communicating with other clients 12, 14 (peers) and a server 16 if present.

The user interface 74 handles lower-level details of interacting with a local user, and is typically graphically oriented (i.e., a GUI). It is responsible for presenting and managing the display 30 of FIG. 3, for example.

The collection/reporting block 76 collects context information (e.g., steps 44-48 of FIG. 4) and reports it to wherever the prediction model is maintained. This information is generally obtained from the local operating system (O/S). In a peer-to-peer implementation, each client 12,14 maintains a respective prediction model in a local PI subsystem 78, whereas in a client-server implementation the model is maintained by the server 16, which receives the reporting from the collection/reporting block 76 via the peer/server interface 72.

The PI subsystem 78, when present, builds and maintains a response time prediction model and provides response time estimates for the other system users as targets 42. Thus it receives context and time reporting from all other clients 12, 14 via the peer/server interface 72, and directly drives the local user interface 74 with PI information.

Figure 6:
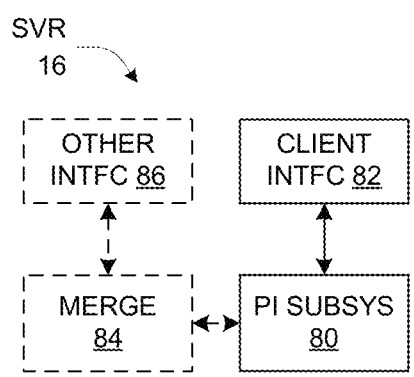
FIG. 6 is a functional block diagram of a server device.

FIG. 6 shows analogous functional organization of the server 16 when present, i.e., in a client-server implementation. The main component is the PI subsystem 80, which may be essentially the same as the client-based PI subsystem 78 except that it also communicates PI information (estimated response times) to all the clients 12, 14 via a client interface 82. The server 16 may also implement a merging function (MERGE) 84 which may require another interface (OTHER INTFC) 86. This would be used to incorporate information not available from the clients 12, 14. One example is a calendar application, which may reside on a separate calendar system to which a client 12, 14 connects in regular use. The server 16 may query the calendar application via the other interface 86 to obtain scheduling information that is incorporated into the context information by the merging function 84.

The communications between the PI subsystem 80 and the collection/reporting 76 at each client 12,14 may employ either a pull (information sent on request) or push (information sent unsolicited) model. Push techniques are generally more efficient.

Figure 7:
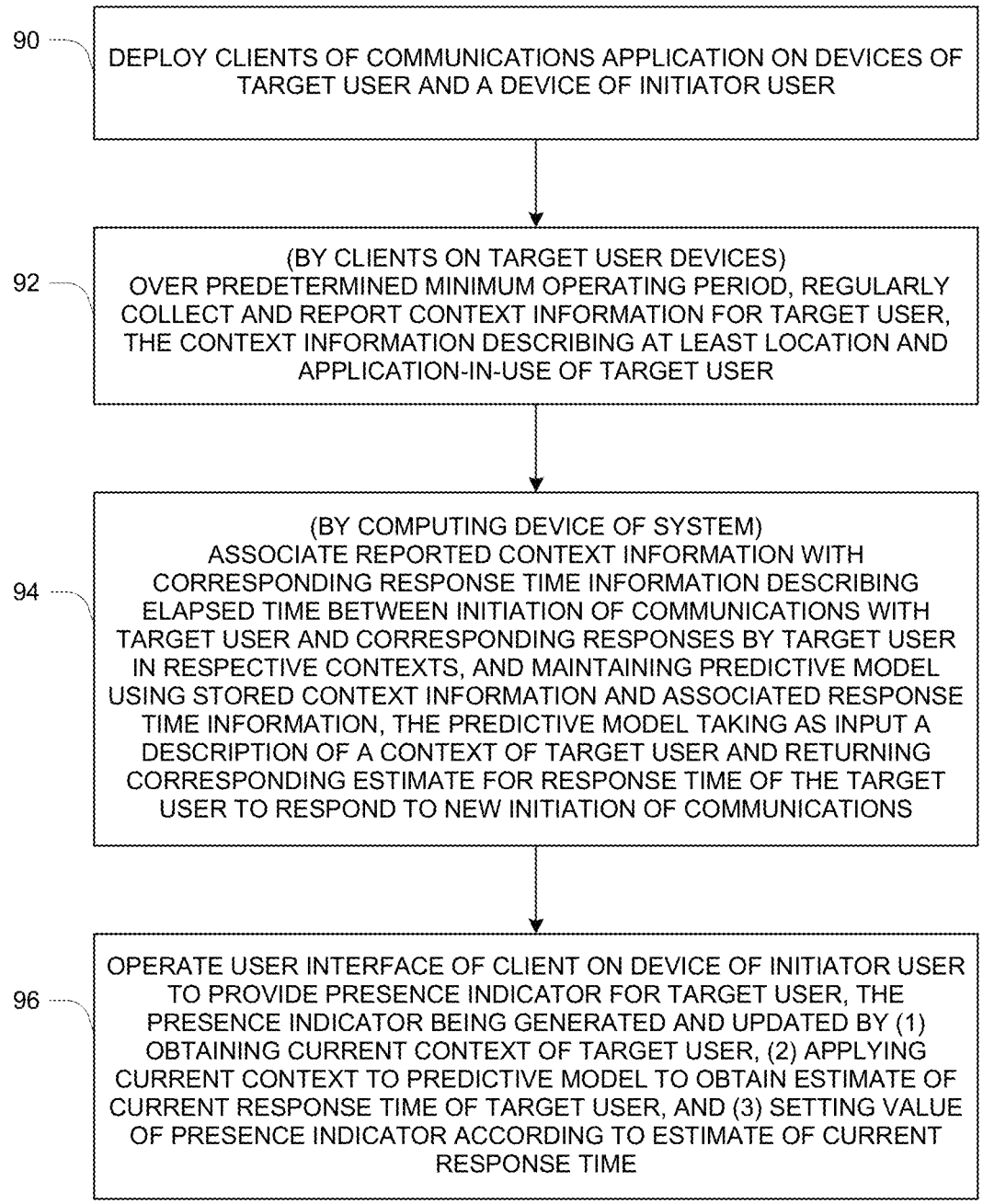
FIG. 7 is a flow diagram of system operation.

FIG. 7 is a more formal flow-diagram description of a method of operating a distributed computing system to provide presence information about a target user to an initiator user.

At 90, clients of a communications application are deployed on devices of the target user and a device of the initiator user.

At 92, the clients on the target user devices operate over a predetermined minimum operating period to regularly collect and report context information for the target user. The context information describes at least location and application-in-use of the target user. In various embodiments, other context information may also be collected and reported.

Step 94 is performed by a computing device of the system, which in the peer-to-peer implementation might be a client device (e.g., target 14) or in a client/server implementation might be one or more separate servers (e.g., server 16). The computing device associates the reported context information with corresponding response time information describing elapsed time between initiation of communications with the target user and corresponding responses by the target user in respective contexts. It also maintains a predictive model using the stored context information and associated response time information. The predictive model takes as input a description of a context of the target user, and returns a corresponding estimate for a response time of the target user to respond to a new initiation of communications.

At 96, a user interface of the initiator device is operated to provide a presence indicator for the target user to the initiator user. The presence indicator is generated and updated by (1) obtaining current context of the target user (e.g., the current location of the user as well as the other context features), (2) applying the current context to the predictive model to obtain an estimate of a current response time of the target user, and (3) setting a value of the presence indicator according to the estimate of the current response time.

In one embodiment, presence indication functionality as described herein may be included in addition to other presence functionality such as Extensible Messaging and Presence Protocol (XMPP), a set of open technologies for instant messaging, presence, multi-party chat, voice and video calls, collaboration, lightweight middleware, content syndication, and generalized routing of XML data.

Various additional functions and more specific examples of the functions, as describe elsewhere herein, may be included in various embodiments.

While various embodiments of the invention have been particularly shown and described, it will be understood by those skilled in the art that various changes in form and details may be made therein without departing from the scope of the invention as defined by the appended claims.

What is claimed is:

1. A method of operating a distributed computing system to provide presence information about a target user to an initiator user, comprising:
    deploying respective clients of a communications application on devices of the target user and a device of the initiator user;
    by the clients on the devices of the target user over a predetermined minimum operating period before a new initiation of communications by the initiator user, regularly collecting and reporting context information for the target user, the context information describing at least location and application-in-use of the target user;

by a computing device of the system, associating the reported context information with corresponding response time information describing elapsed time between initiations of communications with the target user and corresponding responses by the target user in respective contexts, and maintaining a predictive model using the reported context information and associated response time information, the predictive model taking as input a description of a context of the target user and returning a corresponding estimate for a response time of the target user to respond to the new initiation of communications; and operating a user interface of the client on the device of the initiator user to provide a presence indicator for the target user to the initiator user, the presence indicator being generated and updated by (1) obtaining current context of the target user, (2) applying the current context to the predictive model to obtain an estimate of a current response time of the target user, and (3) setting a value of the presence indicator according to the estimate of the current response time.

2. The method of claim 1 utilizing a peer-to-peer organization of the distributed computing system, wherein the computing device is the device of the initiator user and receives the context information reported for the target user.

3. The method of claim 1 utilizing a client-server organization of the distributed computing system, wherein the computing device is a server that (i) receives the context information reported for the target user, and (ii) provides the estimate of the current response time of the target user to the device of the initiator user for displaying as part of the user interface.

4. The method of claim 3, wherein the clients on the devices of the target user use a push technique to report the context information to the server unsolicited.

5. The method of claim 3 employing an extensible messaging and presence protocol for providing additional presence information to the device of the initiator user beyond the estimate of response time for the presence indicator.

6. The method of claim 3, wherein the server further includes an interface to a calendar system for the target user and a merging function, and is operative to merge calendar scheduling information from the calendar system with the context information for the target user both for maintaining the predictive model and for applying the current context to the predictive model to generate the estimate of the current response time of the target user.

7. The method of claim 1, wherein:

maintaining the predictive model includes generating a data series $\{D\}$ where each item Di includes a respective timestamp_i, delta_i, and context_i, the context_i including the context information, the delta_i being an associated actual response time, and the timestamp_i being an associated time-of-day; and applying the current context to the predictive model includes (i) querying the data series $\{D\}$ to find events D_i that satisfy constraints of time_of_day=within a predetermined time window of the current time, and device_type=current_device_type used by the target user, (ii) forming a result dataset $\{D'\}$ including a predetermined minimum number of most recently obtained data items, and (iii) calculating an estimated response time range as a statistical range about a statistical median of the response times of the dataset $\{D'\}$.

8. The method of claim 7, wherein, if $\{D'\}$ initially has less than the predetermined minimum number of most recently obtained data items, one or both of the constraints are relaxed until the result dataset $\{D'\}$ includes the predetermined minimum number of data items.

9. The method of claim 1, wherein the presence indicator includes a colorable or shadeable graphical element, and wherein the value of the presence indicator is a color or shade in a range of colors or shades representing a predetermined range of response times.

10. The method of claim 1, wherein the context information further includes a speed of the target user, the speed being non-zero when the target user is moving.

11. The method of claim 1, wherein the predictive model includes an identification of periodic patterns in the context information.

12. The method of claim 1, wherein the devices of the target user include a stationary device and a mobile device, and wherein the context information for each device of the target user includes a respective device type.

13. The method of claim 1, wherein the presence indicator of the user interface is updated in response to action by the initiator user that precedes initiation of communication.

14. The method of claim 13, wherein the action includes selecting or highlighting an identifier of the target user in the user interface.

15. The method of claim 1, wherein the predictive model is specific to the initiator user and reflects past response times of the target user specifically to the initiator user as distinct from response times to other users.

16. A client computerized device for use in a distributed computing system, the client computerized device including one or more processors, memory, and I/O interface circuitry coupled together by one or more data buses, the memory storing computer program instructions executed by the client computerized device to form a set of functional components including a user interface for displaying information to a local user, a remote device interface for exchanging data with other computerized devices of the distributed computing system, and a collection/reporting component, wherein:

the collection/reporting component regularly collects and reports context information for the local user over a predetermined minimum operating period before a new initiation of communications by the initiator user, the context information describing at least location and application-in-use of the local user, the context information being reported to a computing device of the distributed communications system where the reported context information is associated with corresponding response time information describing elapsed time between initiations of communications with the local user and corresponding responses by the local user in respective contexts, the computing device maintaining a first predictive model using the reported context information and associated response time information, the first predictive model taking as input a description of a context of the local user and returning a corresponding estimate for a response time of the local user to respond to the new initiation of communications by a remote user; and operating the user interface to provide a presence indicator to the local user as a local initiator user, the presence indicator providing presence information for the remote user as a remote target user with whom the local initiator user initiates communications, the presence indicator being generated and updated by (1) obtaining current context of the remote target user and applying the current context to a second predictive model to obtain an estimate of a current response time of the remote target user, and (2) setting a value of the presence indicator according to the estimate of the current response time of the remote target user.

17. The client computerized device of claim 16, wherein the distributed computing system utilizes a peer-to-peer organization in which (1) the computing device is a remote client device of the remote user, and (2) the client computing device includes a PI subsystem that maintains the second predictive model and uses the second predictive model to set the value of the presence indicator.

18. The client computerized device of claim 16, wherein the distributed computing system utilizes a client-server organization in which the computing device is a server that includes a PI subsystem that (1) maintains both the first predictive model and the second predictive model, (2) uses the second predictive model to obtain the estimate of the current response time of the remote user and provide the estimate to the user interface of the client computerized device for setting the value of the presence indicator, and (3) uses the first predictive model to obtain an estimate of a current response time of the local user and provides the estimate to a remote client computerized device of the remote user for setting a value of a presence indicator for the local user as a target user.

19. A server computerized device for use in a distributed computing system, the server computerized device including one or more processors, memory, and I/O interface circuitry coupled together by one or more data buses, the memory storing computer program instructions executed by the server computerized device to form a set of functional components including a client device interface for exchanging data with client computerized devices of the distributed computing system, the client computerized devices executing respective user interfaces including respective presence indicators for other users as target users, the functional components further including a PI subsystem for providing presence information about target users to initiator users of the distributed computing system, wherein:

the PI subsystem (1) regularly collects respective context information for the first and second users, the context information describing at least location and application-in-use, and maintains a first predictive model and a second predictive model for respective first and second users as target users, each predictive model using the respective collected context information and associated response time information, (2) before a new initiation of communications by the second user to the first user, uses the first predictive model to obtain an estimate of a current response time of the first user and provides the estimate to a second client computerized device of the second user for setting a value of a first presence indicator for the first user as a target user, and (3) before a new initiation of communications by the first user to the second user, uses the second predictive model to obtain an estimate of a current response time of the second user and provides the estimate to a first client computerized device of the first user for setting a value of a second presence indicator for the second user as a target user.

20. The server computerized device of claim 19, wherein the functional components further include an interface to a calendar system for the users and a merging function, and is operative to merge calendar scheduling information from the calendar system with context information for the users as target users both for maintaining the predictive models and for applying current context to the predictive models to generate the estimates of the current response time of the respective users.

* * * * *